(12) United States Patent
Ichiki et al.

(10) Patent No.: US 11,070,142 B2
(45) Date of Patent: Jul. 20, 2021

(54) POWER CONVERSION DEVICE WITH CONTROL OF SWITCHING ELEMENT BASED ON CURRENT DETECTION

(71) Applicant: Mitsubishi Electric Corporation, Tokyo (JP)

(72) Inventors: Satoru Ichiki, Tokyo (JP); Akito Tanaka, Tokyo (JP); Shunsuke Kubota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/623,029

(22) PCT Filed: Nov. 15, 2017

(86) PCT No.: PCT/JP2017/041066
§ 371 (c)(1),
(2) Date: Dec. 16, 2019

(87) PCT Pub. No.: WO2019/097602
PCT Pub. Date: May 23, 2019

(65) Prior Publication Data
US 2020/0403526 A1 Dec. 24, 2020

(51) Int. Cl.
*H02M 7/21* (2006.01)
*H02M 7/217* (2006.01)
(Continued)

(52) U.S. Cl.
CPC ......... *H02M 7/217* (2013.01); *H02M 1/4225* (2013.01); *H02M 3/158* (2013.01); *H02M 2001/0009* (2013.01)

(58) Field of Classification Search
CPC ......... H02M 2001/0009; H02M 3/158; H02M 7/217
See application file for complete search history.

(56) References Cited

U.S. PATENT DOCUMENTS 3,784,893 A   1/1974   Rando
2002/0074862 A1   6/2002   Saga et al.
(Continued)

FOREIGN PATENT DOCUMENTS

EP   1 691 474 A2   8/2006
EP   3 168 972 A1   5/2017
(Continued)

OTHER PUBLICATIONS

Office Action dated Aug. 28, 2020 in corresponding EP patent application No. 17 909 662.3.
(Continued)

*Primary Examiner* — Fred E Finch, III
*Assistant Examiner* — Rafael O De Leon Domenech
(74) *Attorney, Agent, or Firm* — Posz Law Group, PLC (57) ABSTRACT

A power conversion device includes a single-phase full-wave rectifying unit, an electrolytic capacitor, a plurality of chopper circuits that are arranged between the single-phase full-wave rectifying unit and the electrolytic capacitor, each of the chopper circuits including a reactor, a first MOSFET connected in parallel with the single-phase full-wave rectifying unit, and a second MOSFET connected to a positive terminal of the electrolytic capacitor at one end and to the reactor and the first MOSFET at the other end, a first current detecting unit to bidirectionally detect a current flowing through the reactor, and a control unit to control an operation of the first MOSFET by using the detection result from the first current detecting unit.

11 Claims, 8 Drawing Sheets

(51) Int. Cl.
  *H02M 1/42* (2007.01)
  *H02M 3/158* (2006.01)
  *H02M 1/00* (2006.01)

(56) References Cited

U.S. PATENT DOCUMENTS

| | | |
|---|---|---|
| 2006/0176037 A1 | 8/2006 | Flatness et al. |
| 2011/0096576 A1 | 4/2011 | Takahashi et al. |
| 2014/0002932 A1 | 1/2014 | Tang et al. |
| 2014/0223949 A1* | 8/2014 | Sakae .................. H02M 7/23 62/324.1 |
| 2016/0380575 A1* | 12/2016 | Tsumura .............. H02P 29/50 318/478 |
| 2017/0310209 A1 | 10/2017 | Terui |
| 2018/0115162 A1* | 4/2018 | Ichiki .................. H02M 5/458 |
| 2018/0226891 A1 | 8/2018 | Zhang |

FOREIGN PATENT DOCUMENTS

| | | |
|---|---|---|
| JP | 2011-091981 A | 5/2011 |
| JP | 2011-239630 A | 11/2011 |
| JP | 2012-029487 A | 2/2012 |
| JP | 2013-179805 A | 9/2013 |
| JP | 2015-023606 A | 2/2015 |
| JP | 2015-080314 A | 4/2015 |
| JP | 5734441 B2 | 6/2015 |
| JP | 2015-122835 A | 7/2015 |
| JP | 2016-144353 A | 8/2016 |
| KR | 101759739 B1 | 7/2017 |
| WO | 2017/009950 A1 | 1/2017 |
| WO | 2017/073829 A1 | 5/2017 |

OTHER PUBLICATIONS

International Search Report of the International Searching Authority dated Jan. 23, 2018 for the corresponding international application No. PCT/JP2017/041066 (and English translation).

Extended European Search Report dated Sep. 23, 2019 issued in corresponding EP patent application No. 17909662.3.

Office Action dated Jul. 8, 2020 for the corresponding Australian patent application No. 2017440157.

Office Action dated Jun. 23, 2020 in corresponding JP patent application No. 2019-554090 (and English translation).

European Office Action dated Mar. 12, 2021, issued in corresponding European Patent Application No. 17909662.3.

* cited by examiner

POWER CONVERSION DEVICE WITH CONTROL OF SWITCHING ELEMENT BASED ON CURRENT DETECTION

CROSS REFERENCE TO RELATED APPLICATION

This application is a U.S. national stage application of International Patent Application No. PCT/JP2017/041066 filed on Nov. 15, 2017, the disclosure of which is incorporated herein by reference.

TECHNICAL FIELD

The present invention relates to a power conversion device that converts alternating-current power to direct-current power.

BACKGROUND

A conventional power conversion device converts alternating-current power to direct-current power using an active converter circuit that includes reactors, reverse blocking diodes, and semiconductor switching elements. An example of an active converter circuit is an interleaved power-factor regulating circuit. An interleaved power-factor regulating circuit includes a plurality of boost chopper circuits, each including a reactor, a reverse blocking diode, and a semiconductor switching element. In an interleaved power-factor regulating circuit, the semiconductor switching elements in their respective boost chopper circuits are driven in such a manner that the phases thereof are shifted from each other. Further, with recent advances in semiconductor devices, a power-factor regulating circuit that employs a synchronous rectification technique has been proposed as a low-loss power-factor regulating circuit. The proposed power-factor regulating circuit uses a MOSFET (Metal Oxide Semiconductor Field Effect Transistor), which is a low-loss semiconductor, in place of the reverse blocking diode (see Patent Literature 1).

PATENT LITERATURE

Patent Literature 1: Japanese Patent Application Laid-open No. 2015-23606

The conventional power-factor regulating circuit described above that uses a MOSFET detects a current flowing through each reactor and executes control such that the MOSFET is turned on when a current flows from the reactor to an electrolytic capacitor. However, with the conventional power-factor regulating circuit described above, if the MOSFET is turned on at a timing other than when it is under the control as described above due to a short-circuit failure in the MOSFET or a malfunction in the MOSFET caused by noise or the like, an overcurrent flows to internal components. Thus, to prevent a failure from occurring in the semiconductor switching element or the like or abnormal heating of the reactor or the like caused by an overcurrent, i.e., to protect the internal components, a power conversion device including the conventional power-factor regulating circuit described above requires a separate protection circuit. Consequently, a power conversion device including the conventional power-factor regulating circuit described above has a problem in that there is an increase in the number of its components, resulting in an increase in the substrate size and an increase in the size of the device.

SUMMARY

The present invention has been achieved in view of the above problems, and an object of the present invention is to provide a power conversion device that can protect its internal components while minimizing an increase in the number of components used therein.

In order to solve the above problems and achieve the object, a power conversion device according to an aspect of the present invention includes: a rectifier to convert an alternating-current voltage to a direct-current voltage; and a capacitor connected in parallel with the rectifier. Moreover, the power conversion device includes a plurality of chopper circuits that are arranged between the rectifier and the capacitor, each of the chopper circuits including a reactor connected to a positive output terminal of the rectifier, a first switching element connected in parallel with the rectifier, and a second switching element connected to a positive terminal of the capacitor at one end and to the reactor and the first switching element at another end. Moreover, the power conversion device includes a first current detecting unit arranged between the reactor and a connection point arranged between the first switching element and the second switching element, the first current detecting unit bidirectionally detecting a current flowing through the reactor. Moreover, the power conversion device includes a control unit to control an operation of the first switching element by using a detection result from the first current detecting unit.

The power conversion device according to the present invention has an effect where it is possible to protect its internal components while minimizing an increase in the number of components used therein.

DETAILED DESCRIPTION

A power conversion device according to embodiments of the present invention will be described in detail below with reference to the accompanying drawings. The present invention is not limited to the embodiments.

First Embodiment

Figure 1:
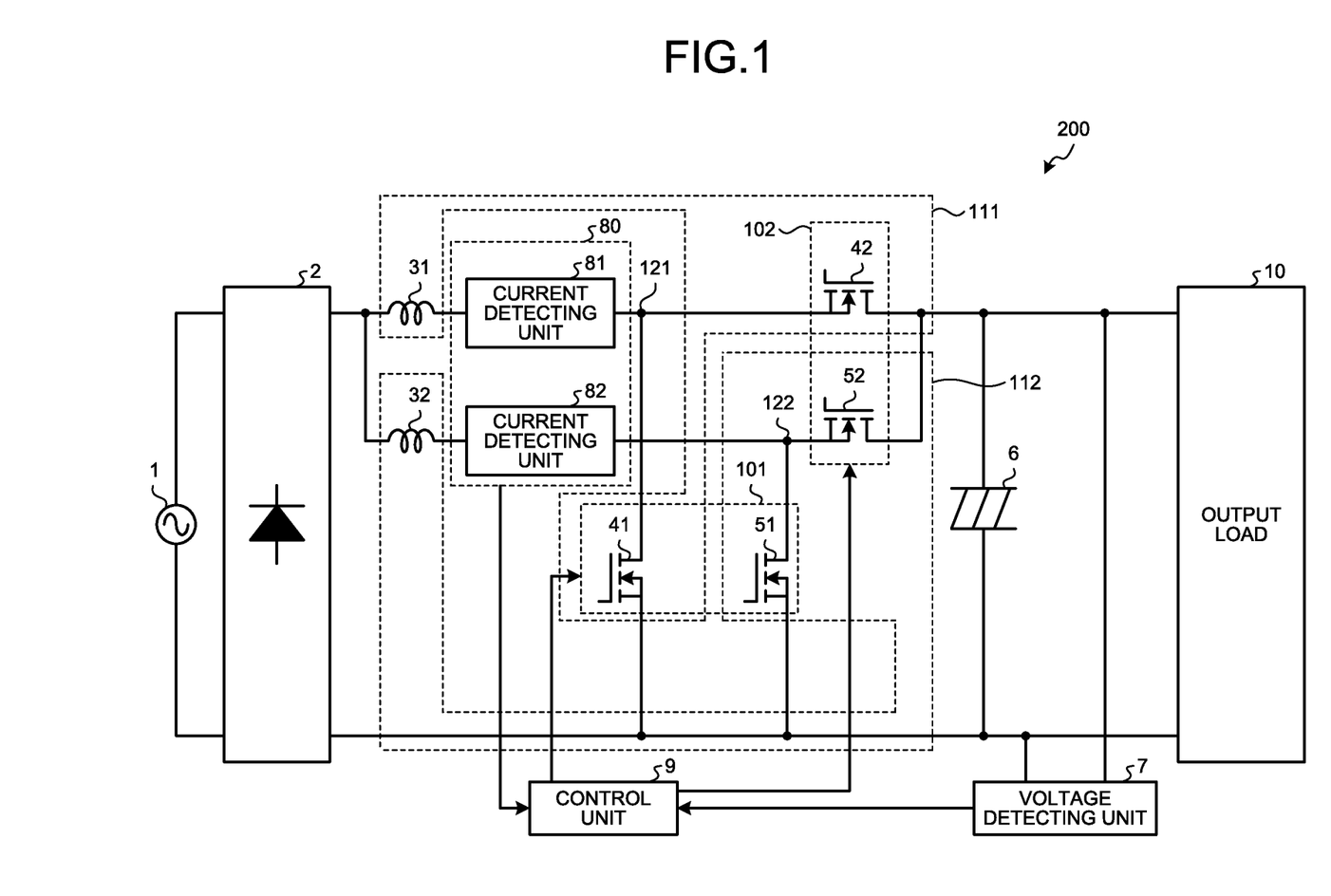
FIG. 1 is a diagram illustrating an example configuration of a power conversion device according to a first embodiment.

FIG. 1 is a diagram illustrating an example configuration of a power conversion device 200 according to a first embodiment of the present invention. As illustrated in FIG. 1, the power conversion device 200 according to the first embodiment includes a single-phase full-wave rectifying unit 2, reactors 31 and 32, first MOSFETs 41 and 51, second MOSFETs 42 and 52, an electrolytic capacitor 6, a voltage detecting unit 7, current detecting units 81 and 82, and a control unit 9. The power conversion device 200 converts an alternating-current voltage supplied from a single-phase alternating-current power supply 1 to a direct-current voltage; corrects the power factor of the direct-current voltage; and supplies the direct-current voltage after power-factor correction to an output load 10. FIG. 1 illustrates the power conversion device 200 as well as the single-phase alternating-current power supply 1 and the output load 10 that are connected to the power conversion device 200.

The single-phase full-wave rectifying unit 2 is a rectifier that rectifies an alternating-current voltage output from the single-phase alternating-current power-supply 1 to convert it to a direct-current voltage. The single-phase full-wave rectifying unit 2 has a positive output terminal and a negative output terminal (not illustrated).

A first chopper circuit 111 is constituted by the reactor 31, the first MOSFET 41, and the second MOSFET 42. In a similar manner, a second chopper circuit 112 is constituted by the reactor 32, the first MOSFET 51, and the second MOSFET 52. The first chopper circuit 111 and the second chopper circuit 112 are arranged between the single-phase full-wave rectifying unit 2 and the electrolytic capacitor 6. The first chopper circuit 111, the second chopper circuit 112, and the electrolytic capacitor 6 operate as what is called an "interleaved power-factor correction circuit" under the control of the control unit 9. Thus, the first MOSFET 41 and the first MOSFET 51 are driven such that they are out of phase with each other by 180 degrees. Each of the first MOSFET 41 and the first MOSFET 51 is a first switching element driven in an interleaved manner in the power-factor correction circuit. Each of the second MOSFET 42 and the second MOSFET 52 is a second switching element functioning as a reverse blocking element in the power-factor correction circuit. The first chopper circuit 111 and the second chopper circuit 112 may be collectively referred to as simply the "chopper circuit".

The reactor 31 is connected to the positive output terminal of the single-phase full-wave rectifying unit 2 at one end and to the current detecting unit 81 at the other end. The reactor 32 is connected to the positive output terminal of the single-phase full-wave rectifying unit 2 at one end and to the current detecting unit 82 at the other end.

The first MOSFET 41 is connected to the reactor 31 via the current detecting unit 81 at one end and to the negative output terminal of the single-phase full-wave rectifying unit 2 at the other end. The first MOSFET 51 is connected to the reactor 32 via the current detecting unit 82 at one end and to the negative output terminal of the single-phase full-wave rectifying unit 2 at the other end. The first MOSFETs 41 and 51 are each connected in parallel with the single-phase full-wave rectifying unit 2. The second MOSFET 42 is connected to the electrolytic capacitor 6 at one end and to the reactor 31 via the current detecting unit 81 at the other end. The second MOSFET 52 is connected to the electrolytic capacitor 6 at one end and to the reactor 32 via the current detecting unit 82 at the other end. The first MOSFET 41 and the second MOSFET 42 are connected in series with each other, and the one end of the first MOSFET 41 and the other end of the second MOSFET 42 are connected to each other at a connection point 121. The first MOSFET 51 and the second MOSFET 52 are connected in series with each other, and the one end of the first MOSFET 51 and the other end of the second MOSFET 52 are connected to each other at a connection point 122.

The first MOSFETs 41 and 51 are collectively referred to as "first MOSFET unit 101". In a similar manner, the second MOSFETs 42 and 52 are collectively referred to as "second MOSFET unit 102". Further, the first MOSFETs 41 and 51 and the second MOSFETs 42 and 52 may be generally referred to simply as "MOSFETs". The electrolytic capacitor 6 is an example of a capacitor and it includes a positive terminal and a negative terminal. The positive terminal is connected to the one end of each of the second MOSFETs 42 and 52 and the negative terminal is connected to the negative output terminal of the single-phase full-wave rectifying unit 2. The electrolytic capacitor 6 is connected in parallel with the single-phase full-wave rectifying unit 2, and it smooths the direct-current voltage output from the chopper circuit described above. The voltage detecting unit 7 detects the direct-current voltage across the terminals of the electrolytic capacitor 6.

The current detecting unit 81 is arranged between the reactor 31 and the connection point 121, and it bidirectionally detects a current flowing through the reactor 31. A bidirectional current means a current that flows in a direction from the reactor 31 to the second MOSFET 42 and a current that flows in a direction from the second MOSFET 42 to the reactor 31. The current detecting unit 82 is arranged between the reactor 32 and the connection point 122, and it bidirectionally detects a current flowing through the reactor 32. A bidirectional current means a current that flows in a direction from the reactor 32 to the second MOSFET 52 and a current that flows in a direction from the second MOSFET 52 to the reactor 32. The current detecting units 81 and 82 are collectively referred to as "first current detecting unit 80".

The control unit 9 acquires detection results from the voltage detecting unit 7 and the current detecting units 81 and 82, i.e., a direct-current voltage value that is a detection value detected by the voltage detecting unit 7 and current values that are detection values detected by the current detecting units 81 and 82. The control unit 9 is a microcontroller that uses the acquired detection results to control operations of the first MOSFET unit 101 and the second MOSFET unit 102, i.e., to control turning on and off of the first MOSFETs 41 and 51 and the second MOSFETs 42 and 52.

Figure 2:
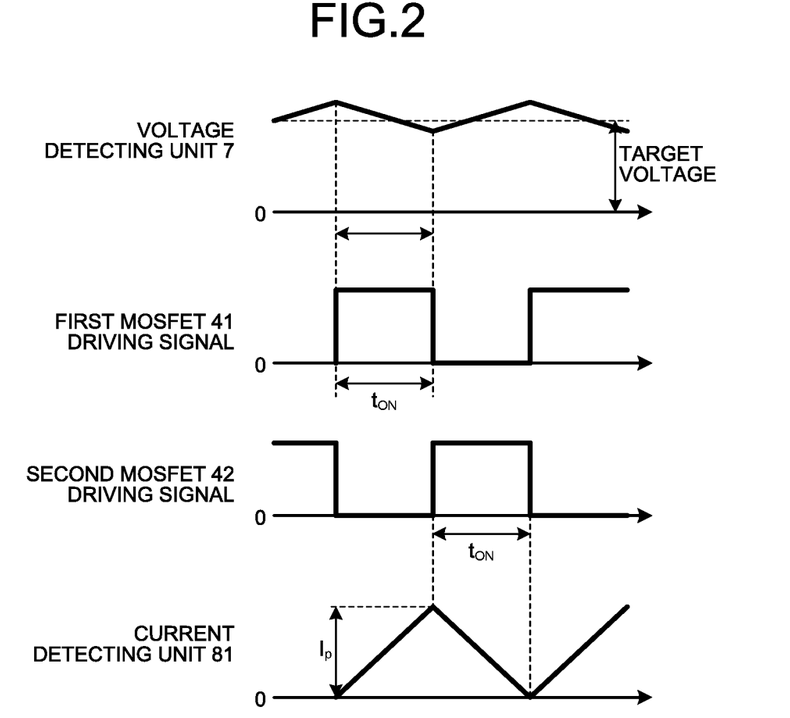
FIG. 2 is a diagram illustrating an example of detection values input to a control unit and driving signals output from the control unit during a normal state in the power conversion device according to the first embodiment.

Next, an operation of the power conversion device 200 is described. First, a description will be given of the operation of the power conversion device 200 during a normal state where no failure has occurred. FIG. 2 is a diagram illustrating an example of detection values input to the control unit 9 and driving signals output from the control unit 9 during a normal state in the power conversion device 200 according to the first embodiment. The control unit 9 controls switching of the first MOSFETs 41 and 51 and the second MOSFETs 42 and 52 such that the direct-current voltage value detected by the voltage detecting unit 7 becomes a target voltage. Specifically, during a period $t_{ON}$, the control unit 9 outputs the driving signal to turn on the first MOSFET 41 and turns off the second MOSFET 42 in order to cause electric charge to be accumulated in the reactor 31. During the next period $t_{ON}$, the control unit 9 turns off the first MOSFET 41 and outputs the driving signal to turn on the second MOSFET 42 in order to charge the electrolytic capacitor 6 with the electric charge accumulated in the reactor 31. The control unit 9 changes the length of the period described above in accordance with the detection value of the voltage detecting unit 7 and repeats the above process, thereby executing control such that the detection value of the voltage detecting unit 7, i.e., a direct-current voltage output to the output load 10, becomes the target voltage.

The control unit 9 also executes control that turns on the first MOSFET 51 and the second MOSFET 52 alternately during a normal state. The control unit 9 turns off the second MOSFET 52 while turning on the first MOSFET 51, and it turns off the first MOSFET 51 while turning on the second MOSFET 52. Further, the period of time during which the control unit 9 turns on the first MOSFET 41 and the period of time during which the control unit 9 turns on the first MOSFET 51 are different from each other. As will be described later, similar control is executed also in a case where the number of chopper circuits is three or more. In the power conversion device 200, the direction of a current $I_P$ flowing through the reactors 31 and 32 is only in one direction from the reactors 31 and 32 to the electrolytic capacitor 6. Thus, when operations are normal, each of the current detecting units 81 and 82 only detects the current $I_P$ flowing in one direction from the corresponding reactor 31 or 32 to the electrolytic capacitor 6 and outputs a detection value to the control unit 9. The control unit 9 uses the detection results acquired from the current detecting units 81 and 82, i.e., the values of currents flowing through the current detecting units 81 and 82, to control operations of the first MOSFETs 41 and 51 and the second MOSFETs 42 and 52.

Figure 3:
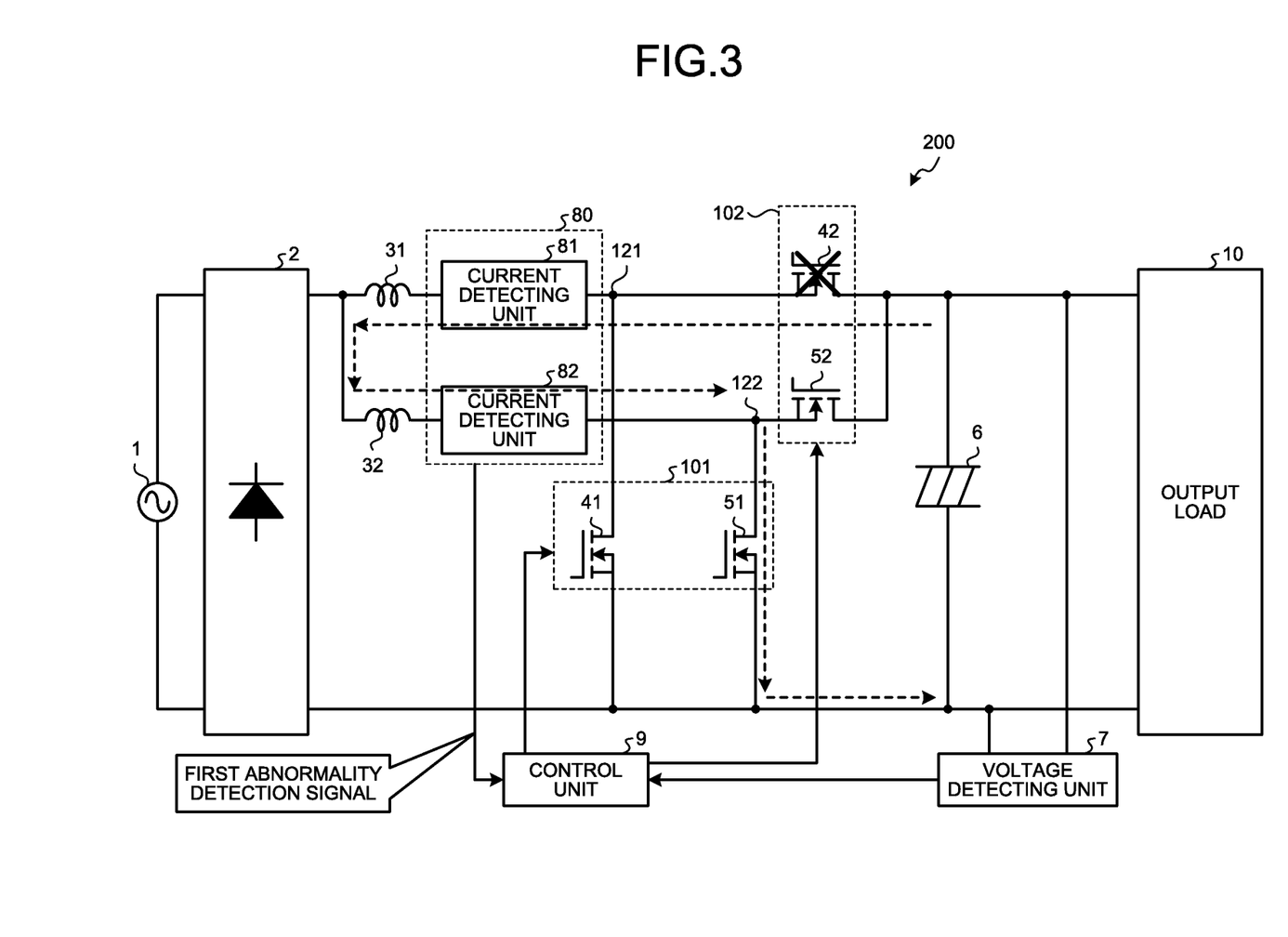
FIG. 3 is a diagram illustrating an operation of the power conversion device according to the first embodiment when a second MOSFET is turned on due to a malfunction.

Next, a description will be given, as an example, of an operation of the power conversion device 200 when one MOSFET is turned on due to a failure or a malfunction caused by noise or the like. FIG. 3 is a diagram illustrating an operation of the power conversion device 200 according to the first embodiment when the second MOSFET 42 is turned on due to a malfunction. FIG. 3 omits broken lines representing the first chopper circuit 111 and the second chopper circuit 112 in order to simplify the descriptions.

In the power conversion device 200, when the first MOSFET 51 is turned on while the second MOSFET 42 is on due to a malfunction, the current indicated by a broken arrow in FIG. 3 flows. At this time, the current detecting unit 81 detects the reverse current that is not generated when operations are normal illustrated in FIG. 2, i.e., a current that flows from the second MOSFET 42 to the reactor 31. Having detected a current that is opposite to the current that flows when operations are normal, the current detecting unit 81 determines that an abnormal operation has occurred in the power conversion device 200. The current detecting unit 81 outputs a first abnormality detection signal indicating that an abnormality in the power conversion device 200 has been detected to the control unit 9. Having acquired the first abnormality detection signal, the control unit 9 executes control that stops operations of the first MOSFETs 41 and 51.

In a similar manner, when the first MOSFET 41 is turned on while the second MOSFET 52 is on due to a malfunction, the current detecting unit 82 detects the current that flows from the second MOSFET 52 to the reactor 32. Having detected a current that is opposite to the current that flow when operations are normal, the current detecting unit 82 determines that an abnormal operation has occurred in the power conversion device 200. The current detecting unit 82 outputs a first abnormality detection signal to the control unit 9. Having acquired the first abnormality detection signal, the control unit 9 executes control that stops the operations of the first MOSFETs 41 and 51.

Figure 4:
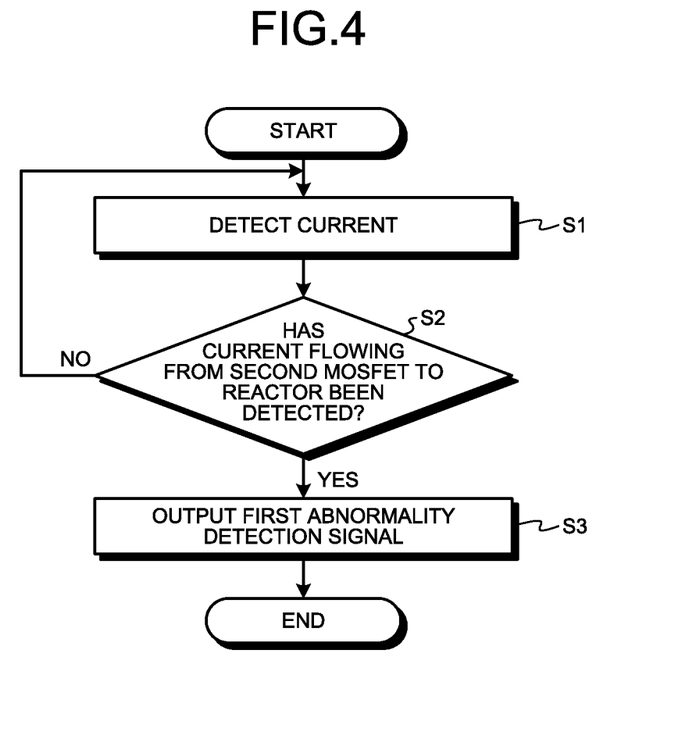
FIG. 4 is a flowchart illustrating operations of the current detecting units of the power conversion device according to the first embodiment.

FIG. 4 is a flowchart illustrating operations of the current detecting units 81 and 82 of the power conversion device 200 according to the first embodiment. Because the operations of the current detecting units 81 and 82 are similar to each other, only the operation of the current detecting unit 81 is described as an example. The current detecting unit 81 detects the current that flows between the reactor 31 and the second MOSFET 42 (Step S1). In a case where the current detecting unit 81 has not detected any current flowing from the second MOSFET 42 to the reactor 31 (NO at Step S2), the process returns to Step S1 and the current detecting unit 81 continues detecting for a current. In a case where the current detecting unit 81 has detected a current flowing from the second MOSFET 42 to the reactor 31 (YES at Step S2), the current detecting unit 81 outputs a first abnormality detection signal to the control unit 9 (Step S3).

Figure 5:
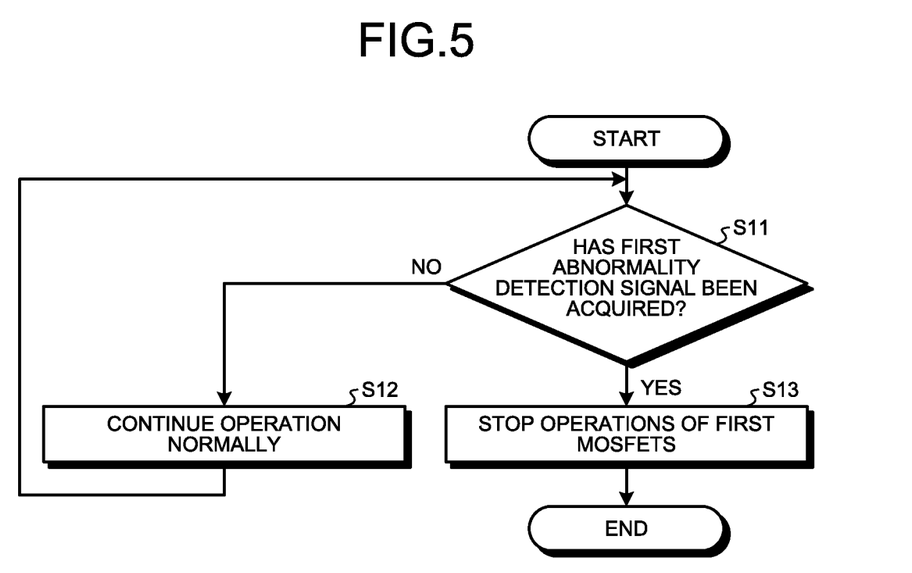
FIG. 5 is a flowchart illustrating an operation of the control unit of the power conversion device according to the first embodiment.

FIG. 5 is a flowchart illustrating an operation of the control unit 9 of the power conversion device 200 according to the first embodiment. In a case where the control unit 9 has not acquired a first abnormality detection signal from the current detecting unit 81 or the current detecting unit 82 (NO at Step S11), the control unit 9 continues operating normally (Step S12) and the process returns to Step S11. In a case where the control unit 9 has acquired a first abnormality detection signal from the current detecting unit 81 or the current detecting unit 82 (YES at Step S11), the control unit 9 executes control that stops operations of the first MOSFETs 41 and 51 (Step S13).

It is currently mainstream to use a semiconductor containing silicon (Si) for a diode constituting a MOSFET. However, instead of such a semiconductor, a wide bandgap semiconductor of which the material is silicon carbide (SiC), gallium nitride (GaN), diamond, or the like may also be used.

A MOSFET fabricated from such a wide bandgap semiconductor has a high voltage resistance and a high allowable current density. Thus, downsizing of the MOSFET is possible, and the use of the downsized MOSFETs enables downsizing of the semiconductor module that incorporates these elements therein. Further, the MOSFET fabricated from such a wide bandgap semiconductor is also high in heat resistance. Because of the high heat resistance, heat-radiating components can be downsized, and therefore further downsizing of the semiconductor module can be realized. Furthermore, the MOSFET fabricated from such a wide bandgap semiconductor is low in power loss. Thus, the MOSFET can have high efficiency, enabling the improvement of the efficiency of the semiconductor module. In addition, switching can be performed at a high frequency. Thus, it is possible to allow a high-frequency current to flow to the output load 10. While it is desirable that both the MOSFETs are fabricated from a wide bandgap semiconductor, it also suffices if either one of the elements is fabricated from a wide bandgap semiconductor. Also in this case, the advantageous effects described in the present embodiment can be realized.

As described above, according to the present embodiment, the power conversion device 200 is configured in such a manner that each of the current detecting units 81 and 82 outputs a first abnormality detection signal to the control unit 9 when an abnormality is detected in the corresponding second MOSFET 42 or 52 on the basis of the direction of the current flow, and the control unit 9 stops operations of the first MOSFETs 41 and 51. With this configuration, it is possible to suppress an overcurrent flowing in the power conversion device 200. In a general power conversion device that includes a power-factor correction circuit, a current that flows through the first MOSFET 41 or 51 is detected by a current detector connected to a negative output terminal of a rectifier circuit, and this detection value is used for control during a normal state. In the present embodiment, the current detecting units 81 and 82 are provided between the reactor 31 and the second MOSFET 42 and between the reactor 32 and the second MOSFET 52, respectively. Thus, it is possible to use each of the current detecting units 81 and 82 as a current detecting unit for measuring a current during a normal state and as a current detecting unit for providing protection against an overcurrent. That is, the current detecting units 81 and 82 function both as a current detecting unit in a general power conversion device and as a protection circuit. With this configuration, the power conversion device 200 can prevent abnormal heating of the reactors 31 and 32 caused by an overcurrent and can also prevent a failure in each of the first MOSFETs 41 and 51. As described above, the power conversion device 200 can protect internal components when an overcurrent is generated while minimizing an increase in the number of components used therein. Further, the power conversion device 200 can suppress an increase in costs caused by an increase in the number of components.

In the first embodiment, each of the current detecting units 81 and 82 determines whether an abnormal operation has occurred and outputs a first abnormality detection signal to the control unit 9 when it has determined that an abnormal operation has occurred, and the control unit 9 executes control depending on whether a first abnormality detection signal has been acquired. However, operations of the current detecting units 81 and 82 and the control unit 9 are not limited thereto. The current detecting units 81 and 82 can each output a detection result indicating a current value and a direction of a current flow to the control unit 9, and the control unit 9 can then determine whether an abnormal operation has occurred in accordance with the detection result acquired from the current detecting unit 81 or 82.

In addition, although the power conversion device 200 including two chopper circuits has been described in the first embodiment, it is only an example. The number of chopper circuits can be three or more. In this case, the power conversion device 200 includes a current detecting unit that has a similar function to that of the current detecting units 81 and 82 for each chopper circuit.

Second Embodiment

In the first embodiment, an operation has been described in which the second MOSFET is turned on due to a malfunction while the first MOSFET in a different chopper circuit is turned on. In a second embodiment, an operation is described in which the second MOSFET is turned on due to a malfunction while the first MOSFET in the same chopper circuit is turned on. In the following descriptions, only parts different from those of the first embodiment are described.

Figure 6:
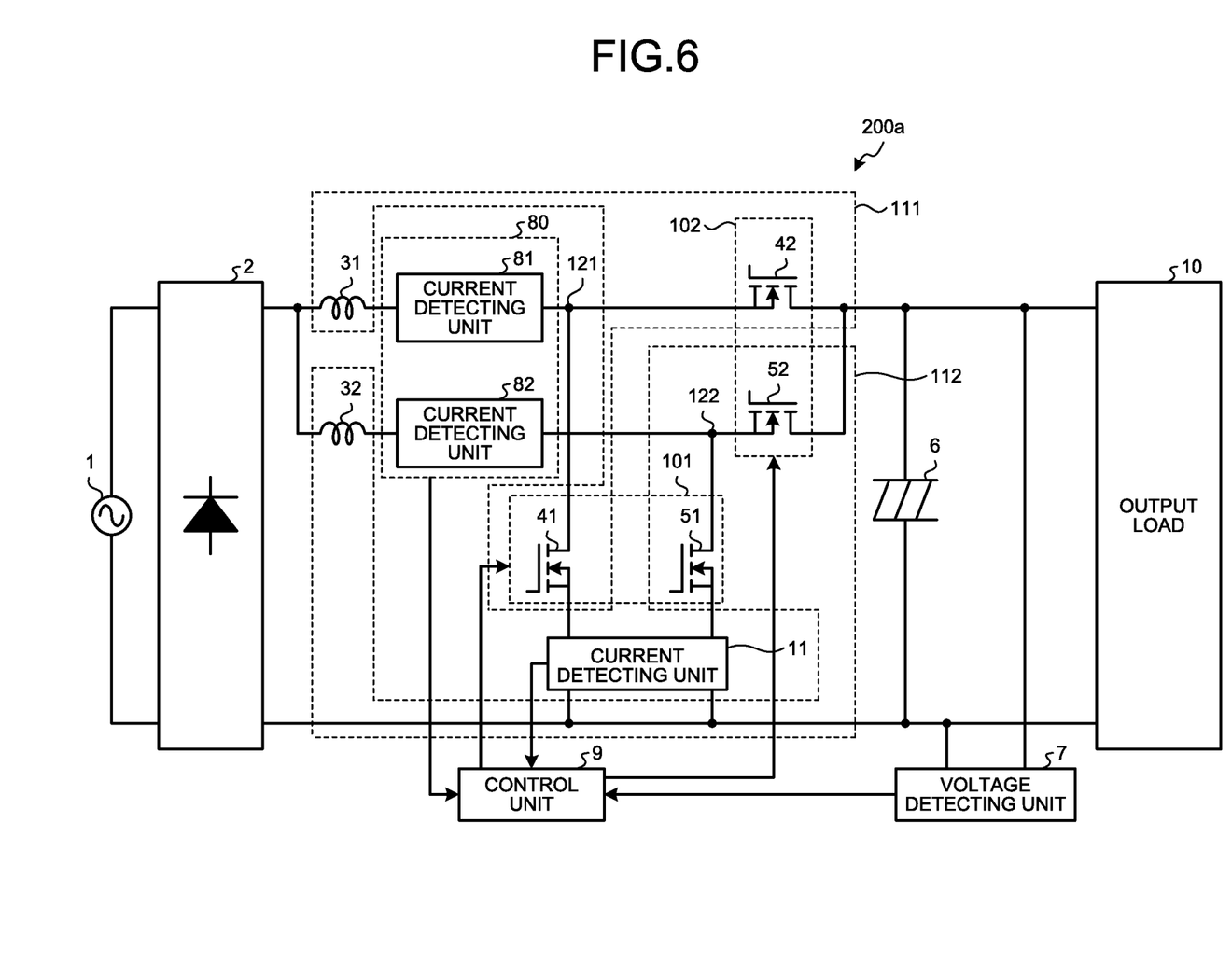
FIG. 6 is a diagram illustrating an example configuration of a power conversion device according to a second embodiment.

FIG. 6 is a diagram illustrating an example configuration of a power conversion device 200a according to the second embodiment. As illustrated in FIG. 6, the power conversion device 200a according to the second embodiment corresponds to the power conversion device 200 according to the first embodiment illustrated in FIG. 1 but with a current detecting unit 11 added thereto. The current detecting unit 11 is a second current detecting unit that is arranged between the other ends of the first MOSFETs 41 and 51 and the negative output terminal of the single-phase full-wave rectifying unit 2 and detects the current output from the first MOSFETs 41 and 51. The current detecting unit 11 can be a single configuration and detect a current from both of the first MOSFETs 41 and 51, or it can be configured to include a dedicated current detecting unit for each first MOSFET, i.e., for each chopper circuit.

Figure 7:
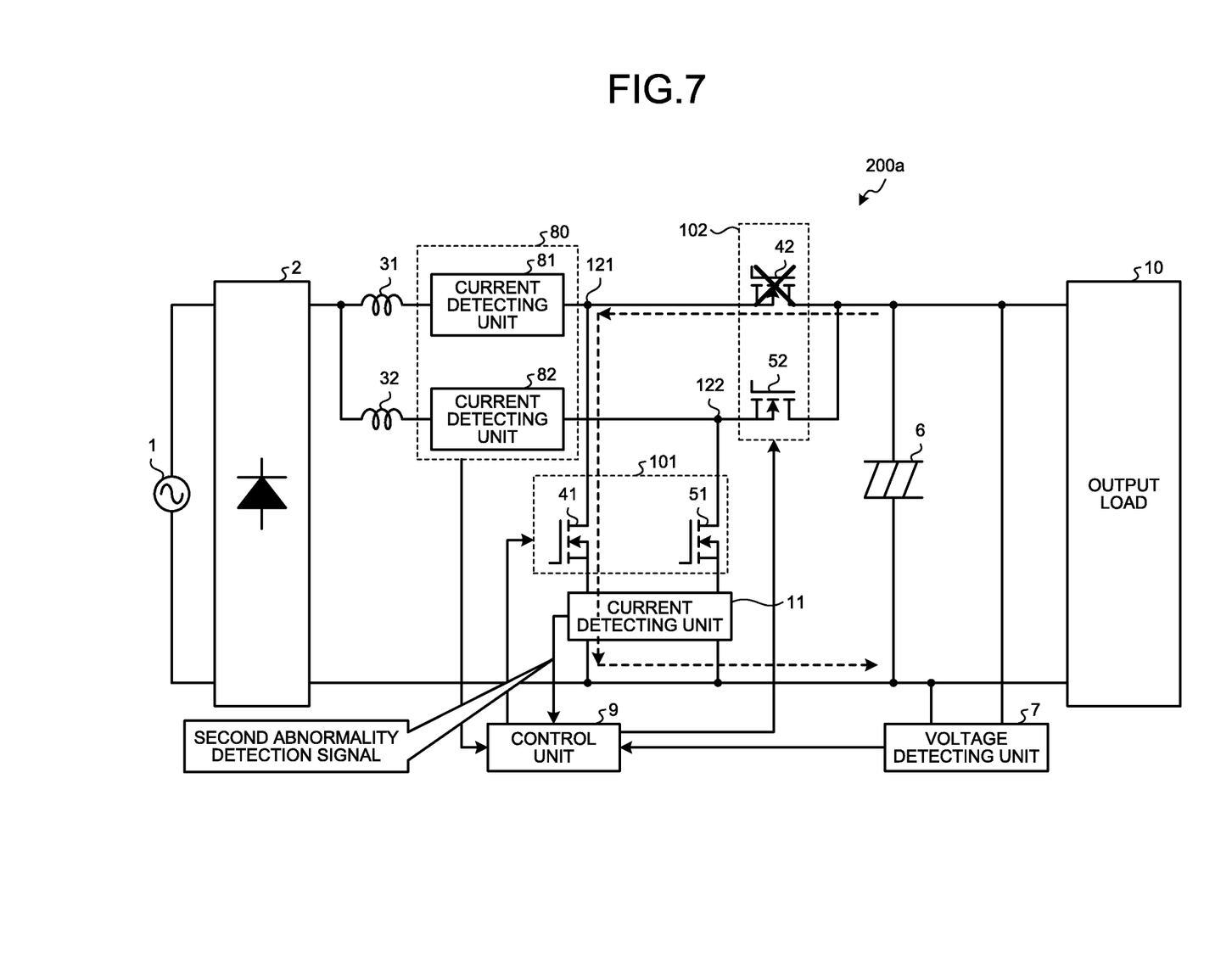
FIG. 7 is a diagram illustrating an operation of the power conversion device according to the second embodiment when the second MOSFET is turned on due to a malfunction.

Next, a description will be given, as an example, of an operation of the power conversion device 200a when one MOSFET is turned on due to a failure or a malfunction caused by noise or the like. FIG. 7 is a diagram illustrating an operation of the power conversion device 200a according to the second embodiment when the second MOSFET 42 is turned on due to a malfunction. FIG. 7 omits broken lines representing the first chopper circuit 111 and the second chopper circuit 112 in order to simplify the descriptions.

Figure 8:
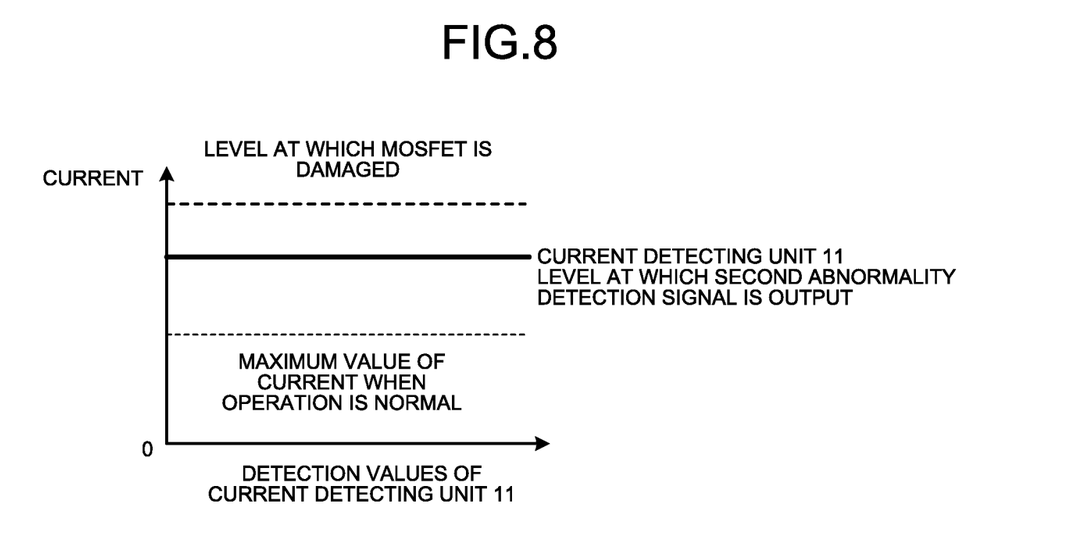
FIG. 8 is a diagram illustrating a method of detecting an abnormality performed by a current detecting unit of the power conversion device according to the second embodiment.

In the power conversion device 200a, when the first MOSFET 41 is turned on while the second MOSFET 42 is on due to a malfunction, the current indicated by a broken arrow in FIG. 7 flows. This current does not flow to the current detecting units 81 and 82 but flows from the second MOSFET 42 to the first MOSFET 41. At this time, a current that is larger than the current flowing when operations are normal flows from the first MOSFET 41 to the current detecting unit 11. Having detected a current larger than the current that flows when operations are normal, the current detecting unit 11 determines that an abnormal operation has occurred in the power conversion device 200a. FIG. 8 is a diagram illustrating a method of abnormality detection performed by the current detecting unit 11 of the power conversion device 200a according to the second embodiment. The current detecting unit 11 sets a value as a level at which a second abnormality detection signal is output, i.e., a threshold. This set value is larger than the maximum value of the current output from the first MOSFET 41 when operations are normal and is smaller than the current level at which a MOSFET is damaged. When the current value of the current output from the first MOSFET 41 exceeds the threshold, the current detecting unit 11 outputs a second abnormality detection signal indicating that an abnormality in the power conversion device 200a has been detected to the control unit 9. Having acquired a second abnormality detection signal, the control unit 9 executes control that stops operations of the first MOSFETs 41 and 51.

In a similar manner, when the first MOSFET 51 is turned on while the second MOSFET 52 is on due to a malfunction, the current detecting unit 11 detects a current larger than that when operations are normal. Having detected a current that exceeds the threshold, the current detecting unit 11 determines that an abnormal operation has occurred in the power conversion device 200a. The current detecting unit 11 outputs a second abnormality detection signal to the control unit 9. Having acquired the second abnormality detection signal, the control unit 9 executes control that stops the operations of the first MOSFETs 41 and 51.

Figure 9:
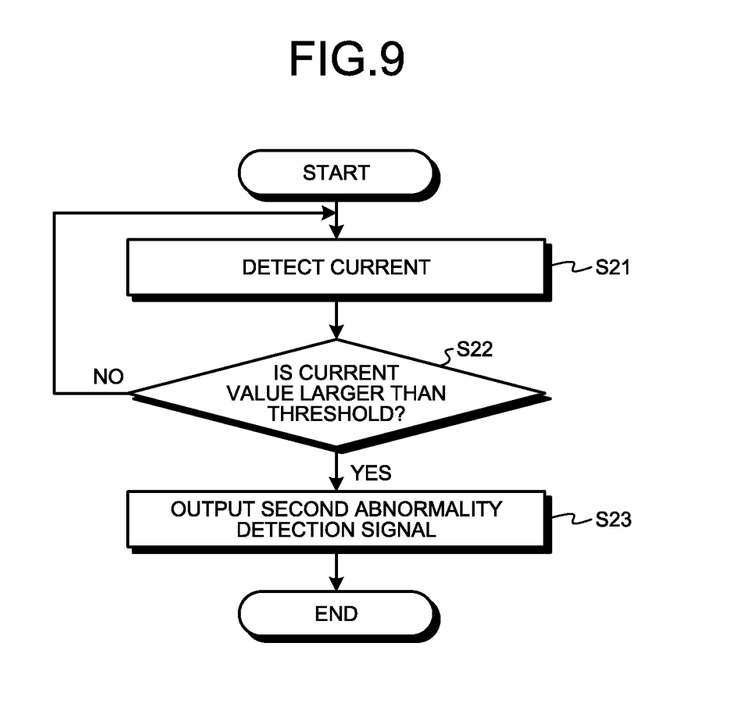
FIG. 9 is a flowchart illustrating an operation of the current detecting unit of the power conversion device according to the second embodiment.

FIG. 9 is a flowchart illustrating an operation of the current detecting unit 11 of the power conversion device 200a according to the second embodiment. The current detecting unit 11 detects the current output from the first MOSFETs 41 and 51 (Step S21). In a case where the current value of each of the current output from the first MOSFETs 41 and 51 is equal to or less than a threshold (NO at Step S22), the process returns to Step S21 and the current detecting unit 11 continues detecting for a current. In a case where the current value of the current output from the first MOSFET 41 or 51 is larger than the threshold (YES at Step S22), the current detecting unit 11 outputs a second abnormality detection signal to the control unit 9 (Step S23).

Figure 10:
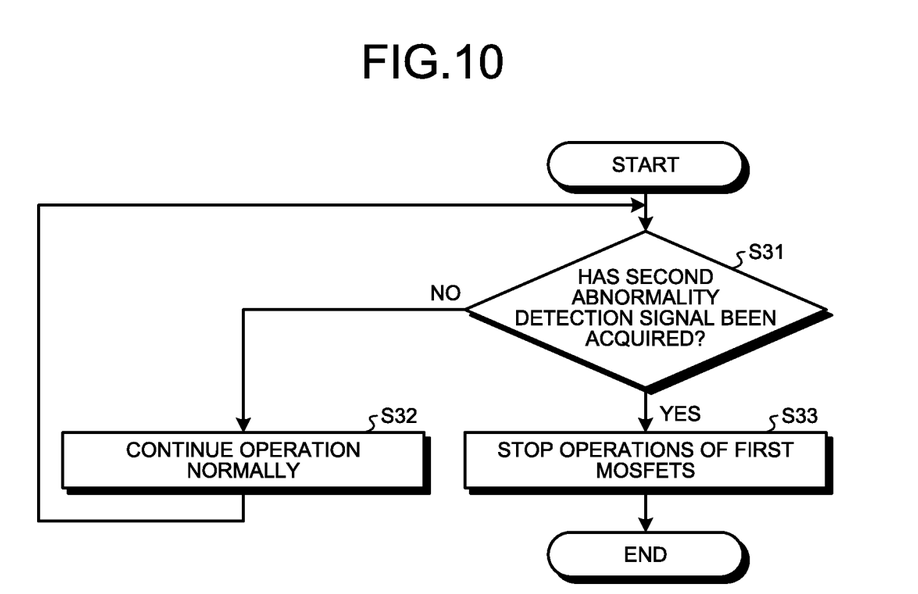
FIG. 10 is a flowchart illustrating an operation of a control unit of the power conversion device according to the second embodiment.

FIG. 10 is a flowchart illustrating an operation of the control unit 9 of the power conversion device 200a according to the second embodiment. In a case where the control unit 9 has not acquired a second abnormality detection signal from the current detecting unit 11 (NO at Step S31), the control unit 9 continues operating normally (Step S32) and the process returns to Step S31. In a case where the control unit 9 has acquired a second abnormality detection signal from the current detecting unit 11 (YES at Step S31), the control unit 9 executes control that stops operations of the first MOSFETs 41 and 51 (Step S33).

As described above, according to the present embodiment, the power conversion device 200a is configured in such a manner that, in a case where the second MOSFET 42 is turned on due to an abnormality while the first MOSFET 41 is turned on or a case where the second MOSFET 52 is turned on due to an abnormality while the first MOSFET 51 is turned on, the current detecting unit 11 outputs a second abnormality detection signal to the control unit 9 when it has detected a current value larger than the value of the current flowing when operations are normal, i.e., an overcurrent, and the control unit 9 stops operations of the first MOSFETs 41 and 51. Accordingly, the power conversion device 200a can protect internal components when an overcurrent is generated. In addition, in a similar manner to the power conversion device 200 according to the first embodiment, the power conversion device 200a can, by using the current detecting unit 81 or 82 to detect an abnormality in the second MOSFET 42 or 52, prevent abnormal heating of the reactors 31 and 32 caused by an overcurrent and can also prevent a failure in each of the first MOSFETs 41 and 51.

In the second embodiment, the current detecting unit 11 determines whether an abnormal operation has occurred, and it outputs a second abnormality detection signal to the control unit 9 when it has determined that an abnormal operation has occurred, and the control unit 9 executes control depending on whether it has acquired a second abnormality detection signal. However, operations of the current detecting units 81 and 82 and the control unit 9 are not limited thereto. The current detecting unit 11 can output a detection result of a current value to the control unit 9, and the control unit 9 can then determine whether an abnormal operation has occurred in accordance with the detection result acquired from the current detecting unit 11.

In addition, although the power conversion device 200a including two chopper circuits has been described in the second embodiment, it is only an example. The number of chopper circuits can be three or more. In this case, in the power conversion device 200a, the current detecting unit 11 detects the current output from a first MOSFET of each chopper circuit. As described above, the current detecting unit 11 can be configured to include a dedicated current detecting unit for each first MOSFET, i.e., for each chopper circuit.

The configurations described in the above embodiments are only examples of the content of the present invention. The configurations can be combined with other well-known techniques, and a part of each configuration can be omitted or modified without departing from the scope of the present invention.

The invention claimed is:

1. A power conversion device comprising:
   a rectifier to convert an alternating-current voltage to a direct-current voltage;
   a capacitor connected in parallel with the rectifier;
   a plurality of chopper circuits that is arranged between the rectifier and the capacitor, each of the chopper circuits including
      a reactor connected to a positive output terminal of the rectifier,
      a first switching element connected in parallel with the rectifier, and
      a second switching element connected to a positive terminal of the capacitor at one end and to its corresponding reactor and its corresponding first switching element at another end;
   a plurality of first current detectors, each of the first current detectors being associated with a corresponding chopper circuit, each of the first current detectors being connected between its corresponding reactor and a connection point arranged between its corresponding first switching element and its corresponding second switching element, each of the first current detectors bidirectionally detecting a current flowing through its corresponding reactor; and
   a controller to control an operation of each first switching element by using a detection result from each corresponding first current detector.

2. The power conversion device according to claim 1, wherein:
   one first current detector of the plurality of first current detectors detects a current that flows from its corresponding second switching element to its corresponding reactor,
   the one first current detector outputs, to the controller, a first abnormality detection signal indicating that the one first current detector detects an abnormality in the power conversion device, and
      when the controller acquires the first abnormality detection signal, the controller stops an operation of all of the first switching elements in the plurality of chopper circuits.

3. The power conversion device according to claim 1, further comprising
   a second current detector arranged between the another end of each first switching element and a negative output terminal of the rectifier, the second current detector detecting a current output from each first switching element.

4. The power conversion device according to claim 3, wherein
   when a current value of a current flowing from one of the first switching elements exceeds a threshold, a corresponding second current detector outputs, to the controller, a second abnormality detection signal indicating that the corresponding second current detector detects an abnormality in the power conversion device, and when the controller acquires the second abnormality detection signal, the controller stops an operation of all of the first switching elements.

5. The power conversion device according to claim 1, wherein the first switching element and the second switching element of each of the plurality of chopper circuits comprises a diode that is fabricated from a wide bandgap semiconductor.

6. The power conversion device according to claim 5, wherein the wide bandgap semiconductor is silicon carbide, gallium nitride, or diamond.

7. The power conversion device according to claim 2, further comprising a second current detector arranged between the another end of each first switching element and a negative output terminal of the rectifier, the second current detector detecting a current output from each first switching element.

8. The power conversion device according to claim 2, wherein the first switching element and the second switching element of each of the plurality of chopper circuits comprises a diode that is fabricated from a wide bandgap semiconductor.

9. The power conversion device according to claim 3, wherein the first switching element and the second switching element of each of the plurality of chopper circuits comprises a diode that is fabricated from a wide bandgap semiconductor.

10. The power conversion device according to claim 7, wherein the first switching element and the second switching element of each of the plurality of chopper circuits comprises a diode that is fabricated from a wide bandgap semiconductor.

11. The power conversion device according to claim 4, wherein the first switching element and the second switching element of each of the plurality of chopper circuits comprises a diode that is fabricated from a wide bandgap semiconductor.

* * * * *